(12) United States Patent
Kimbrough et al.

(10) Patent No.: US 6,362,908 B1
(45) Date of Patent: Mar. 26, 2002

(54) MULTI-SERVICE ADAPTABLE OPTICAL NETWORK UNIT

(75) Inventors: Mahlon Danny Kimbrough, Bedford; John Matthes, Southlake; Barry Joe Ethridge, Forth Worth, all of TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/203,409

(22) Filed: Dec. 2, 1998

(51) Int. Cl.[7] .............................. H04B 10/00; H04J 14/00
(52) U.S. Cl. ........................ 359/163; 359/109; 359/118; 359/119
(58) Field of Search ................................ 359/163, 109, 359/117, 118, 119, 125, 137, 167

(56) References Cited

U.S. PATENT DOCUMENTS

| | | | |
|---|---|---|---|
| 4,863,232 A | * 9/1989 | Kwa | ........................... 359/163 |
| 4,881,225 A | 11/1989 | Dyke et al. | |
| 4,888,765 A | 12/1989 | Dyke | |
| 4,903,292 A | 2/1990 | Dillon | |
| 4,965,790 A | * 10/1990 | Nishino et al. | .............. 359/127 |
| 4,967,193 A | 10/1990 | Dyke et al. | |
| 5,046,067 A | 9/1991 | Kimbrough | |
| 5,218,654 A | * 6/1993 | Sauter | ......................... 359/163 |
| 5,263,081 A | 11/1993 | Nightingale et al. | |
| 5,267,122 A | 11/1993 | Glover et al. | |
| 5,287,344 A | 2/1994 | Bye et al. | |
| 5,303,229 A | 4/1994 | Withers et al. | |
| 5,325,223 A | 6/1994 | Bears | |
| 5,349,457 A | 9/1994 | Bears | |
| 5,355,362 A | 10/1994 | Gorshe et al. | |
| 5,383,180 A | 1/1995 | Kartalopoulos | |
| 5,469,282 A | 11/1995 | Ishioka | |
| 5,500,753 A | 3/1996 | Sutherland | |
| 5,504,606 A | 4/1996 | Frigo | |
| 5,566,239 A | 10/1996 | Garcia et al. | |
| 5,572,347 A | 11/1996 | Burton et al. | |
| 5,600,469 A | 2/1997 | Yamazaki | |
| 5,608,565 A | 3/1997 | Suzuki et al. | |
| 5,640,387 A | 6/1997 | Takahashi et al. | |
| 5,729,370 A | 3/1998 | Bernstein et al. | |
| 5,781,320 A | * 7/1998 | Byers | .......................... 359/123 |
| 5,784,377 A | * 7/1998 | Baydar et al. | ............... 370/463 |
| 5,831,979 A | * 11/1998 | Byers | .......................... 370/360 |
| 5,870,676 A | * 2/1999 | Durvasula et al. | ........... 455/450 |
| 5,926,472 A | * 7/1999 | Byers | .......................... 370/252 |
| 5,982,741 A | * 11/1999 | Ethier | .......................... 370/389 |
| 6,038,048 A | * 3/2000 | Harris et al. | ................. 359/159 |
| 6,091,729 A | * 7/2000 | Dove | .......................... 370/395 |
| 6,147,485 A | * 11/2000 | Halliday et al. | .......... 324/158.1 |

FOREIGN PATENT DOCUMENTS

WO         9729585         8/1997

* cited by examiner

*Primary Examiner*—Leslie Pascal
(74) *Attorney, Agent, or Firm*—Jones, Day, Reavis & Pogue

(57) ABSTRACT

A multi-service, adaptable optical network unit (ONU) is disclosed for use in a fiber-to-the-curb (FTTC) digital loop carrier system, including a multi-service common card and a plurality of multi-media service cards that are connected to the common card using a card-link interface. The card-link interface is preferably a high-speed LVDS serial-bus connection that is organized in a star configuration such that each service card is connected to the multi-service common card using a separate point-to-point card-link. By eliminating the traditional backplane structure found in present ONU designs, the present invention provides a scalable, adaptable, future-proof FTTC system that can transport present-day multi-media services as well as yet-to-be-defined future high-bandwidth applications.

36 Claims, 8 Drawing Sheets

MULTI-SERVICE ADAPTABLE OPTICAL NETWORK UNIT

BACKGROUND OF THE INVENTION

The present invention is related to the field of fiber-to-the-curb ("FTTC") digital loop carrier ("DLC") systems for communicating information in the local access loop between a central office switching station and a plurality of customer locations. In particular, a novel optical network unit ("ONU") for use with such an FTTC system is described, in which the ONU includes at least one multi-service common card coupled to a plurality of service cards via a plurality of high-speed serial interconnections. The high-speed serial interconnections are preferably arranged in a separate point-to-point "star" configuration in which each service card includes a separate high-speed point-to-point serial interface with the one or more multi-service common cards. A family of adaptable multi-service common cards and a scalable FTTC system for delivering present and future multi-media services in the local loop are also disclosed.

By eliminating the traditional backplane found in present ONUs, the ONU of the present invention provides a modular, easily-reconfigurable (i.e. adaptable) architecture that extends the operating life of the ONU far beyond that of traditional ONU designs, and thus enables the system to adapt to unknown services that may or may not be anticipated at the time of installation. Due to the inherent limitations of a backplaned ONU, such adaptability to future services is not possible. Using the features and principles of the present invention, a future-proof, expandable FTTC system can be installed that is capable of providing a multitude of multi-media services over a single fiber-optic connection, such as telephony, high-speed data, CATV, video-on-demand, as well as any number of future services that may require extremely high-bandwidth.

In a typical DLC system, the digital transport capabilities of the phone network are extended from the central office switch into a particular neighborhood or business location. A remote digital ("RDT") is placed at a remote location from the central office and is connected to it via a fiber-optic cable, or some other high-bandwidth connection. The remote digital terminal receives PCM-modulated voice information from the central office switch, converts the digital PCM signals into analog voice signals, and routes the analog voice signals to a particular customer location via a plurality of line-cards (or service cards) that connect the RDT to the customer's equipment. Similarly, the RDT converts analog voice information from the customer to a digital PCM format for transport back to the central office switch. An example of a digital loop carrier system is set forth in U.S. Pat. No. 5,046,067 ("the '067 patent"), which is assigned to the assignee of the present invention. The teaching of this patent is hereby incorporated into the present application by reference.

An FTTC system is an extended version of the DLC system described above, in which the fiber-optic capabilities are extended further into the local loop by fiber-coupling a plurality of ONU telecommunication terminals to the RDT (which is then referred to as a Host Digital Terminal, or HDT), wherein the ONUs are located very close to the customer locations. An example FTTC system is set forth in FIG. 1, discussed in more detail below. The system shown in FIG. 1 is also described in U.S. patent. application Ser. No. 08/794,723, titled "Distributed Ethernet Hub" (the "'723 application"). This application is commonly assigned to the assignee of the present invention and the teaching of this application is hereby incorporated into this disclosure by reference. As shown in FIG. 1, in a typical FTTC system the RDT is converted into an HDT, which, in many respects, is similar to the RDT, except that the HDT is further connected to a plurality of ONU telecommunication terminals via fiber-optic cable. The HDT includes appropriate circuitry and programming for routing signals to and from the plurality of ONUs and the central office switching station.

The ONUs are relatively small pedestal terminals that are physically located in close proximity to a customer's location, such as 500' or less. By placing the ONU in close physical proximity to the customer, high-bandwidth communications can be managed through the ONU over traditional wiretypes. Each ONU typically services a plurality of customers, such as 4 to 8, although, in the future, more customers may be serviced from a single ONU. The ONU provides many functions. It converts optical signals from the HDT into appropriate electrical signals that correspond to the customer's equipment, such as analog phone signals, or high-speed data signals. It provides voltage surge protection for the physical connections to the customer's premises, such as twisted-pair copper or coaxial cable. It provides built-in test capabilities so that the lines to the customer's premises can be tested from the central office. It receives power from the HDT, and converts the received power into a conditioned power level that serves the ONU circuitry, as well as many other functions.

Presently, FTTC systems including ONUs are typically deployed for Plain Old Telephone Service ("POTS"), with the intention of getting fiber-optic cable close to the customer's premises so that present and future broadband services can be provided as they are defined, or as they become economically feasible. One example of these types of broadband services is high-speed Internet access. The '723 application provides a solution to delivering these types of services using presently available ONU technology. Other types of broadband services include CATV, video-on-demand, video conferencing, xDSL, interactive television, digital TV and radio, ISDN, as well as many other yet to be defined high-bandwidth applications. Companies seeking to deploy FTTC systems would like to be sure that future services, which have not even been defined, can still be handled by the FTTC system hardware in place. Thus, a future-proof architecture is desirable for the ONU, which provides the critical link between the FTTC system and the customer premesis. Presently known ONUs are not future-proof.

Presently known ONUs are not capable of being future-proof because they utilize a backplane architecture. FIGS. 2A and 2B, discussed in more detail below, set forth such an ONU incorporating a backplane architecture. In these types of ONUs, the common cards and service cards plug into a circuit-board backplane that includes a plurality of connectors for mating to corresponding connectors on the common or service cards and one or more electrical busses that connect the cards together. The one or more busses are metal interconnections (or traces) embedded in the backplane circuit board. The cards communicate with each other primarily via the backplane traces. Because the structure of the backplane inherently limits the services that can be handled by the ONU, any backplane architecture is not capable of being future-proof.

There are many problems associated with using a backplane structure. First, there is no modularity built into the system, since the position and spacing of the backplane connectors is mechanically fixed. Thus, the backplane can only accept circuit cards of a particular dimension and width. Second, the bandwidth of the backplane is limited by its electrical properties. These electrical properties that limit the bandwidth include the impedance of the interconnections between the circuit boards and the backplane and the impedance limitations of the metallization traces that connect the connectors together. In addition, termination resistors may limit the speed of the backplane bus. Because of these physical and electrical limitations, at higher frequencies it becomes very difficult to accurately distribute any type of clocking (or other data) signals over the backplane, due to skewing of the signals that may render the system inoperable.

In summary, it is not feasible to design a backplane ONU that is future-proof. Unless the operator of the FTTC system is willing to retrofit the ONUs with a new backplane every 3 or 4 years (a very unlikely scenario given the large labor and materials costs involved), the entire system is essentially bandwidth-limited by the structure of the ONU backplane the moment it is installed in the field. This is a very undesirable reality for the customer spending millions of dollars to install an FTTC system.

In addition to the drawing figures set forth below, other presently known ONUs are described in U.S. Pat. Nos. 5,500,753 to Sutherland, 5,600,469 to Yamazaki, and 5,303,229 to Withers. Each of these presently known ONU systems includes a backplane architecture and thus suffers from the many disadvantages noted above. See, for example, FIG. 2 of the '753 patent and FIGS. 1A/1B of the '469 patent. The ONUs described in these patents are not future-proof, are not readily adaptable, do not provide the ability to handle a multitude of services, and therefore do not satisfy the present need in this field for an ONU capable of being used in an FTTC system for many years into the future.

Thus, there remains a general need in this field for a multi-service, adaptable ONU that does not employ a backplane architecture and thus avoids the many disadvantages associated with designing a future-proof backplane.

There remains a more particular need for such an ONU in which a plurality of different types of service cards can be supported via a single common card.

There remains yet another need for a multi-service FTTC system in which telephony, high-speed data, video and other presently undefined high-bandwidth services can be channeled through an adaptable ONU system without undue costs for retrofitting and installation.

There remains still another need for an ONU in which individual service cards can be replaced in the ONU without effecting the other services provided by the ONU.

There remains still another need for an ONU that can support a family of modular common cards, wherein the common card capabilities build from simple telephony cards to more complex telephony/data/video cards, and beyond.

Still another need remains for a preferred method and structure of interconnecting the one or more common cards and the plurality of service cards in a backplane-less ONU so that bandwidth and flexibility are maximized.

SUMMARY OF THE INVENTION

The present invention overcomes the problems noted above and satisfies the needs in this field for a multi-service, adaptable optical network unit for use in a FTTC system. The ONU of the present invention includes a multi-service common card and a plurality of multi-media service cards that are connected to the common card using a card-link interface. The card-link interface is preferably a high-speed LVDS serial-bus connection organized in a star configuration such that each service card is connected to the multi-service common card using a separate point-to-point card-link. By eliminating the traditional backplane structure found in present ONU designs, the present invention provides a scalable, adaptable, future-proof FTTC system that can transport present-day multi-media services as well as yet-to-be-defined future high-bandwidth applications.

One embodiment of the present invention provides a fiber-to-the-curb digital loop carrier system for transporting multi-media information in the local loop between a central office switching station and a plurality of customer locations, comprising: a plurality of host digital terminals coupled to the central office switching station by fiber-optic connections; and at least one optical network unit coupled to a host digital terminal by fiber-optic connections, wherein each optical network unit comprises: at least one multi-service common card including a fiber optic-interface, a service multiplexer, and a plurality of card-link interface circuits; a plurality of service cards including circuitry for processing a particular multi-media service, and at least one card-link interface circuit; and a plurality of card-links coupling the plurality of service cards to the multi-service common card.

Another embodiment of the present invention provides an optical network unit for use in a fiber-to-the-curb system, comprising: a multi-service common card; a plurality of service cards; and a plurality of serial interface connections for communicating information between the common card and the plurality of service cards. The plurality of serial interface connections are preferably connected in a star configuration.

Still another embodiment of the present invention provides a multi-service common card for use in an optical network unit of a fiber-to-the-curb digital loop carrier system, comprising: a fiber optic interface; a service multiplexer; and a plurality of card-link interface circuits.

Another embodiment provides an optical network unit, comprising: a multi-service common card and a plurality of service cards, wherein the multi-service common card includes means for receiving and transmitting optical signals and for converting the optical signals into corresponding electrical signals, means for routing the corresponding electrical signals to the plurality of service cards, and a plurality of card-links for coupling the multi-service common card to the plurality of service cards.

A preferred system-level method of the present invention provides a method of transporting multi-media information in a fiber-to-the-curb digital loop carrier system, comprising the steps of: receiving multi-media information at a central office switching station; converting the multi-media information into optical signals and routing the optical signals to a plurality of host digital terminals via a plurality of fiber optic cables; receiving the multi-media optical signals at the host digital terminals and routing the signals to a plurality of optical network units via a plurality of fiber optic cables; receiving the multi-media optical signals at the plurality of optical network units and converting the signals into corresponding electrical signals; and routing the electrical signals to corresponding multi-media service cards within the optical network unit via a plurality of high-speed serial interface circuits that couple the multi-media service cards to one or more multi-service common cards.

Other embodiments of the present invention will become apparent when reviewing the detailed description of the drawings set forth below.

The present invention provides many advantages over presently known ONUs. Not all of these advantages are simultaneously required to practice the invention as claimed, and the following list is merely illustrative of the types of benefits that may be provided, alone or in combination, by the present invention. These advantages include: (1) a future-proof architecture that can accommodate a wide range of applications and services, including those that have yet to be defined, and which can scale from simple telephony, video or data-only applications to a combination of these three services and beyond; (2) no backplane limitations on bandwidth or interconnection; (3) scalable interconnection to support future services; (4) a preferred star interconnection scheme that allows each service card to operate independently from the other service cards and at a variety of speeds; (5) adaptable, modular, flexible, and low cost; (6) low power operation; (7) variable card-spacing enclosure for holding cards of varying degrees of thickness; (8) preferred low-voltage differential signaling ("LVDS") to support scalable high-speed serial interface between the common card(s) and the plurality of service cards; (9) scalable multi-service common card capable of interfacing to a variety of service cards using a plurality of high-speed serial interface connections; and (10) a special-purpose line-card carrier that enables the use of backplane-type service cards with the present invention.

These are just a few of the many advantages of the present invention, as described in more detail below. As will be appreciated, the invention is capable of other and different embodiments, and its several details are capable of modifications in various respects, all without departing from the spirit the invention. Accordingly, the drawings and description of the preferred embodiments set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE DRAWINGS

Figure 1:
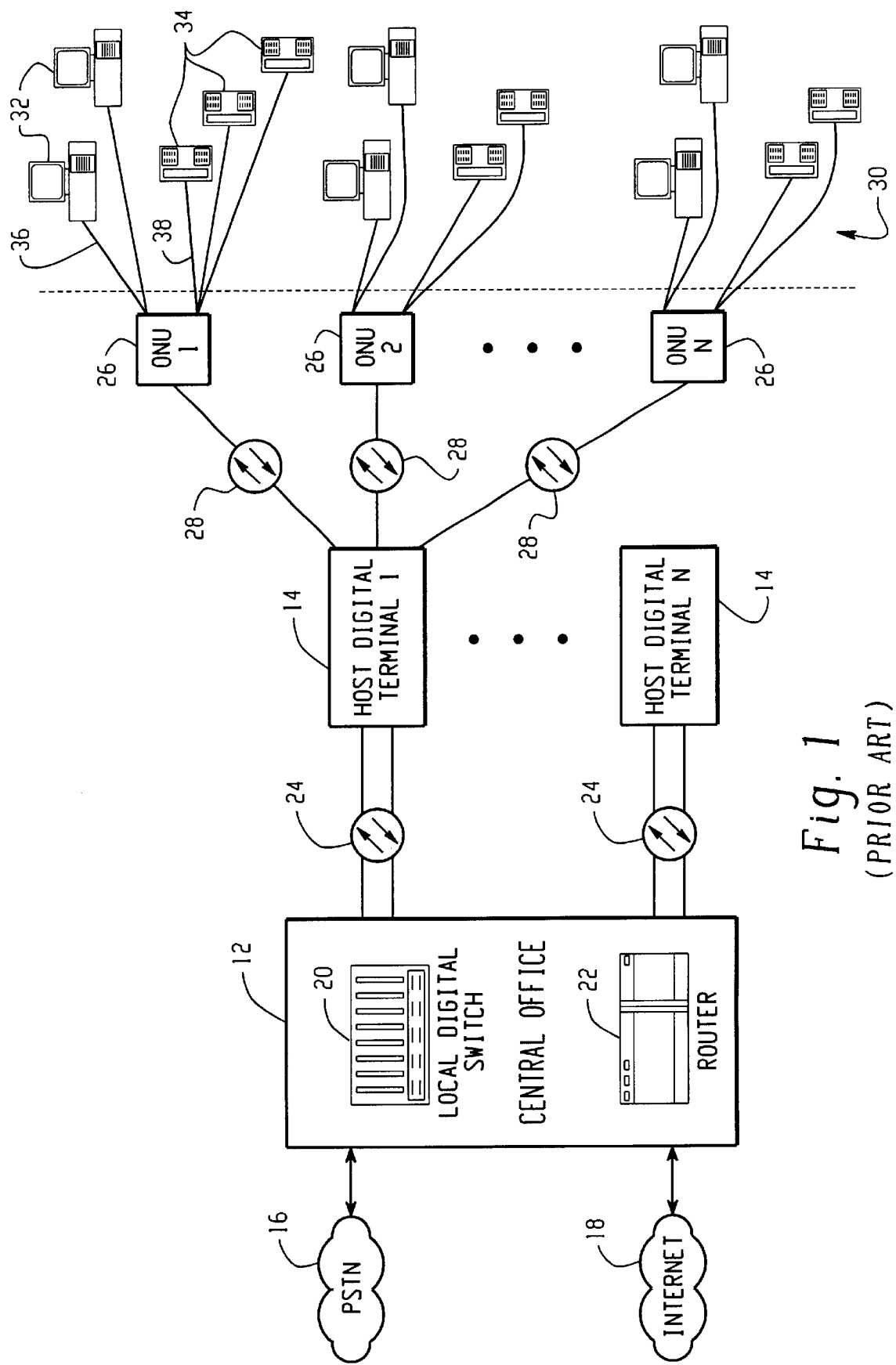
FIG. 1 is a block diagram of a presently known FTTC system for delivering voice and high-speed data in the local loop.
Figure 2A:
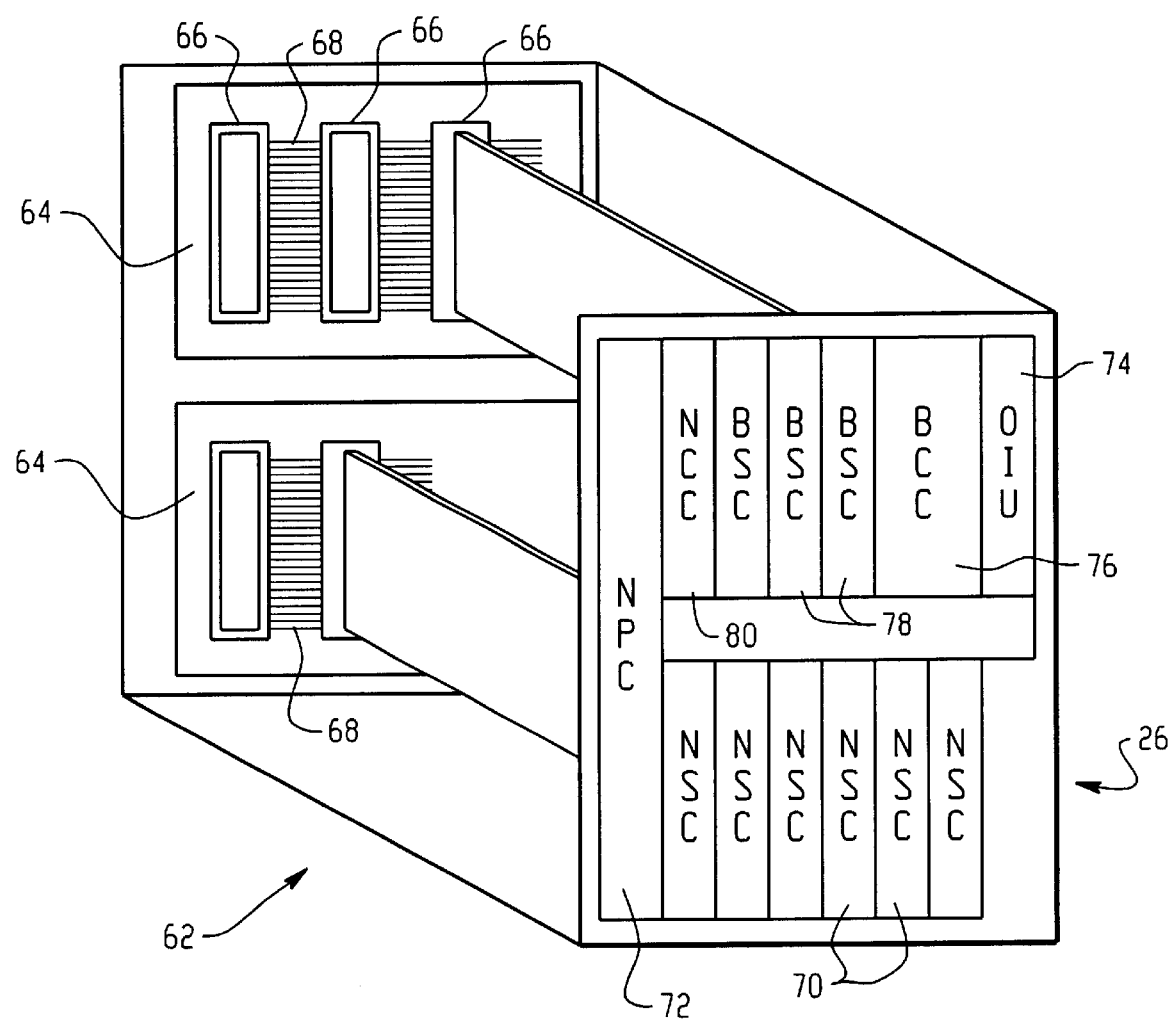
FIG. 2A is a schematic of a presently known ONU card cage for receiving the common cards and service cards into a backplane structure.
Figure 2B:
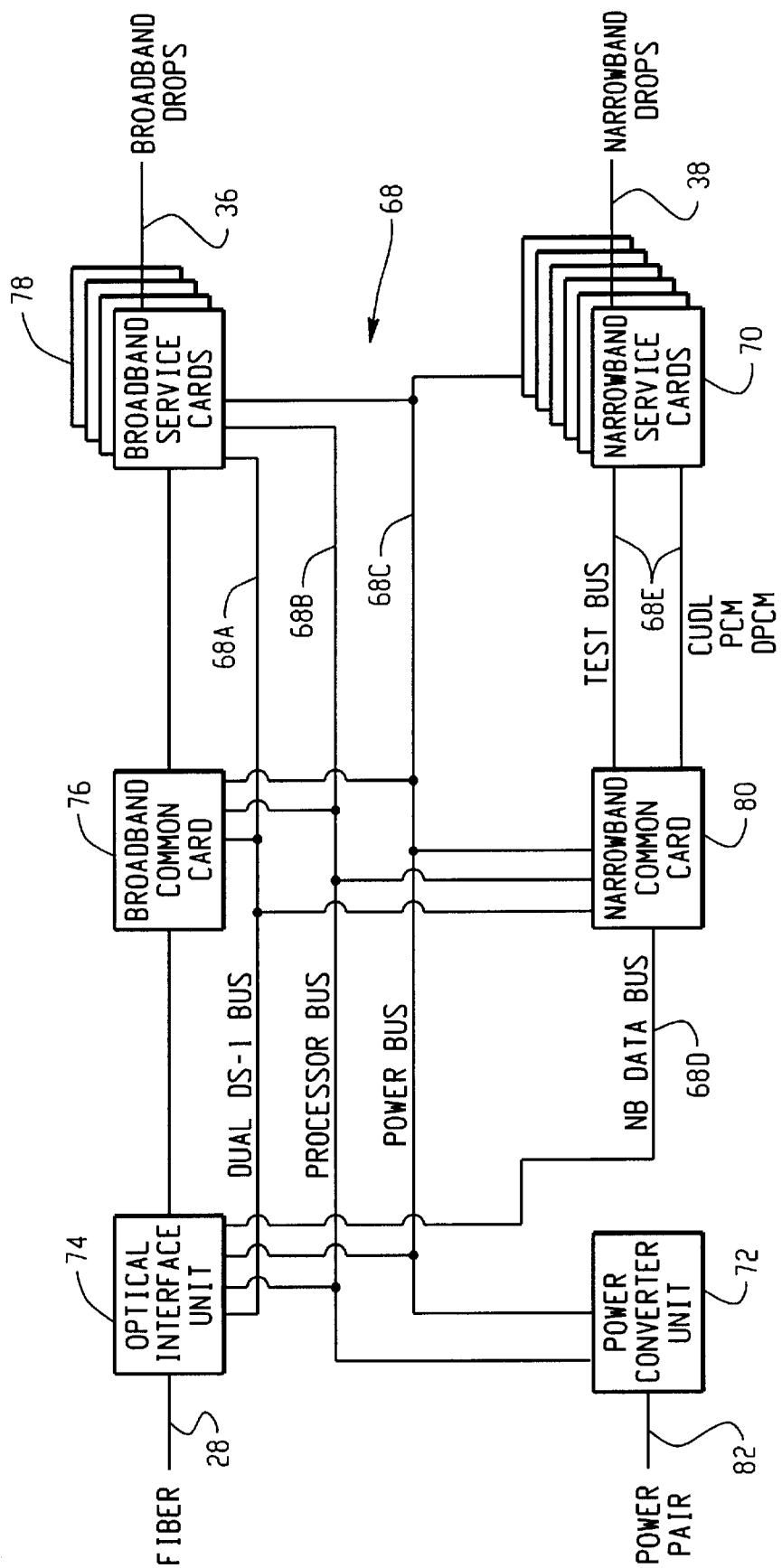
FIG. 2B is a block diagram of a presently known backplane bus interconnection for the ONU shown in FIG. 2A.

Referring now to the drawings, FIGS. 1, 2A and 2B set forth a presently known FTTC system and a presently known backplane-type ONU. Specifically, FIG. 1 is a system diagram, FIG. 2A is a schematic of an ONU card cage for receiving the common cards and service cards into a backplane structure, and FIG. 2B is a block diagram of the backplane bus interconnection for the ONU shown in FIG. 2A.

The FTTC system 10 shown in FIG. 1 includes a plurality of HDTs 14 coupled to a central office switching station 12 via fiber-optic interconnections 24. An example of such an HDT is the DISC*S® digital loop carrier platform manufactured by Reltec Corp. of Bedford, Texas. Each HDT 14 is coupled to a plurality of ONUs 26, also via fiber-optic interconnections 28. The ONUs 26 are then coupled to the customer premises 30, where the signals from the ONU are terminated at customer equipment, such as a computer 32 or telephone 34. The connections from the ONU 26 to the customer equipment can be, for example, coaxial cable 36 or twisted-pair copper 38.

The central office switching station 12 may include a local digital switch 20 or a router 22. The local digital switch 20 couples the central office station 12 to the PSTN for delivering PCM-type voice signals, such as DS-0 or DS-1 signals, and the router 22 couples the station 12 to the Internet for delivering packet data signals, such as Ethernet-type data packets Operationally, the central office switching station 12 receives PCM voice information and packet data from the PSTN and the Internet, processes this information in some manner, converts the information from electrical signals into optical signals, and then routes it to the correct HDT 14 via one or more fiber-optic interconnections 24. Each HDT 14 then further processes the information to determine what ONU to send the information to via fiber-optic connections 28.

The ONU 26 converts the voice and data information from the HDT from optical to electrical signals, such as analog voice signals or Ethernet packet data signals. It then routes these signals to the proper customer premises equipment 32, 34 via interconnections 36, 38. The ONU is typically located within 500 feet of a customer location 30, and thus typically services 8–10 customers. Similarly, the customer premises equipment 32, 34 transmits signals to the local ONU 26, where they are converted into optical signals and combined with signals from other customer's equipment, and then transmitted over fiber-optic cable 28 to a respective HDT 14. The HDT 14 combines the signals from many ONUs 26 and transmits the combined information over fiber-optic cable 24 back to the central office switching station 12, where the information is processed, converted back to an equivalent electrical signal level, and routed to either the PSTN 16 or to the Internet 18, depending on the information type.

FTTC systems as described in FIG. 1 are not cheap. They require a great deal of planning, capital, regulatory approvals, and manpower to implement. Therefore, companies that want to install this type of equipment want it to last for many years, in some cases up to 20-years from the date of installation. Thus, a future-proof system is desirable. Presently, there are no known systems that provide a future-proof architecture that could conceivably provide for the yet to be defined wide-bandwidth services that may be implemented 20-years into the future. The primary reason that known FTTC systems cannot guarantee their viability into the future is because these system utilize an ONU architecture that includes a backplane structure.

FIGS. 2A and 2B set forth a presently known ONU incorporating a backplane architecture. Other known ONUs, such as described in the Sutherland, Yamazaki, and Withers patents, mentioned above, all include a backplane structure at the ONU for physically and electrically connecting the common card(s) and the service cards. In these types of ONUs, the common cards and service cards plug into a circuit-board backplane 64 that includes a plurality of connectors 66 for mating to corresponding connectors on the common or service cards and one or more electrical busses 68A–E that connect the cards together. The one or more busses are metal interconnections (or traces) 68 embedded in the backplane circuit board 64. The cards communicate with each other primarily via the backplane traces. Because the structure of the backplane 64 inherently limits the services that can be handled by the ONU, any backplane architecture is not capable of being future-proof FIG. 2A shows the card-cage 62 of a presently known ONU 26. One or more backplanes 64 are located at the back of the card-cage 62. The backplane 64 is a circuit board that includes a plurality of connectors 66, such as finger-type connectors or pin-connectors, for mating with a corresponding connector on the circuit cards 70, 72, 74, 76, 78 that plug into the one or more backplanes 64. The backplane 64 also includes a large number of metal traces 68 (or interconnections) that may be embedded in one or more metallization layers in the circuit board. These traces 68 form one or more electrical busses that connect the connectors 66 together and form the backplane bus-structure of the ONU 26. The backplane may also include termination resistors that terminate the various bus interconnections 68.

FIG. 2B shows a block diagram of a presently known backplane bus interconnection for the ONU shown in FIG. 2A. This ONU 26 includes a plurality of cards that plug into the backplane 64, such as an optical interface unit 74 for coupling to the optical fiber 28 and converting signals from optical-to-electrical and vice-versa, a broadband common card 76 for processing broadband signals, such as high-speed Internet data or DS-1 telephony information, and for routing the data to the proper service card 78, a power converter unit 72 for coupling to one or more power pair 82 and for providing regulated power to the ONU, and a narrowband common card 80 for processing PCM voice information and for routing the information to the proper service card 70. The broadband service cards 78 transport information to/from the customer premises equipment 32 via coaxial cable 36, and the narrowband service cards 70 transport information to/from the customer premises equipment 34 via twisted-pair copper lines 38.

A plurality of electrical busses formed by the traces 68 of the backplane structure 64 connect the common, service and other cards together in the prior art ONU. These busses may include, for example, a dual DS-1 bus 68A, a processor bus 68B, a power bus 68C, a narrowband data bus 68D and a test/PCM bus 68E. Each of these busses includes a plurality of metal traces 68 that are designed to distribute information and signals between the cards through the backplane connectors 66.

There are many problems associated with using a backplane structure 64 as shown in FIGS. 2A/2B. First, the system is not modular or expandable, since the position and spacing of the backplane connectors 66 is mechanically fixed. Thus, the backplane 64 can only accept circuit cards of a particular dimension and width. Second, the bandwidth of the backplane 64 is limited. The impedance of the interconnections 66 between the circuit boards and the backplane 64, as well as the impedance limitations of the metallization traces 68 that connect the connectors 66 together (and form the variety of busses 68A–E) inherently limit the bandwidth that information can be transported over the backplane bus. Termination resistors may also limit the speed of the backplane bus. Because of these physical limitations of the backplane structure, at higher frequencies it becomes very difficult to accurately distribute any type of clocking signals over the backplane. This results in undesirable skewing of signals that render the system inoperable.

Figure 3:
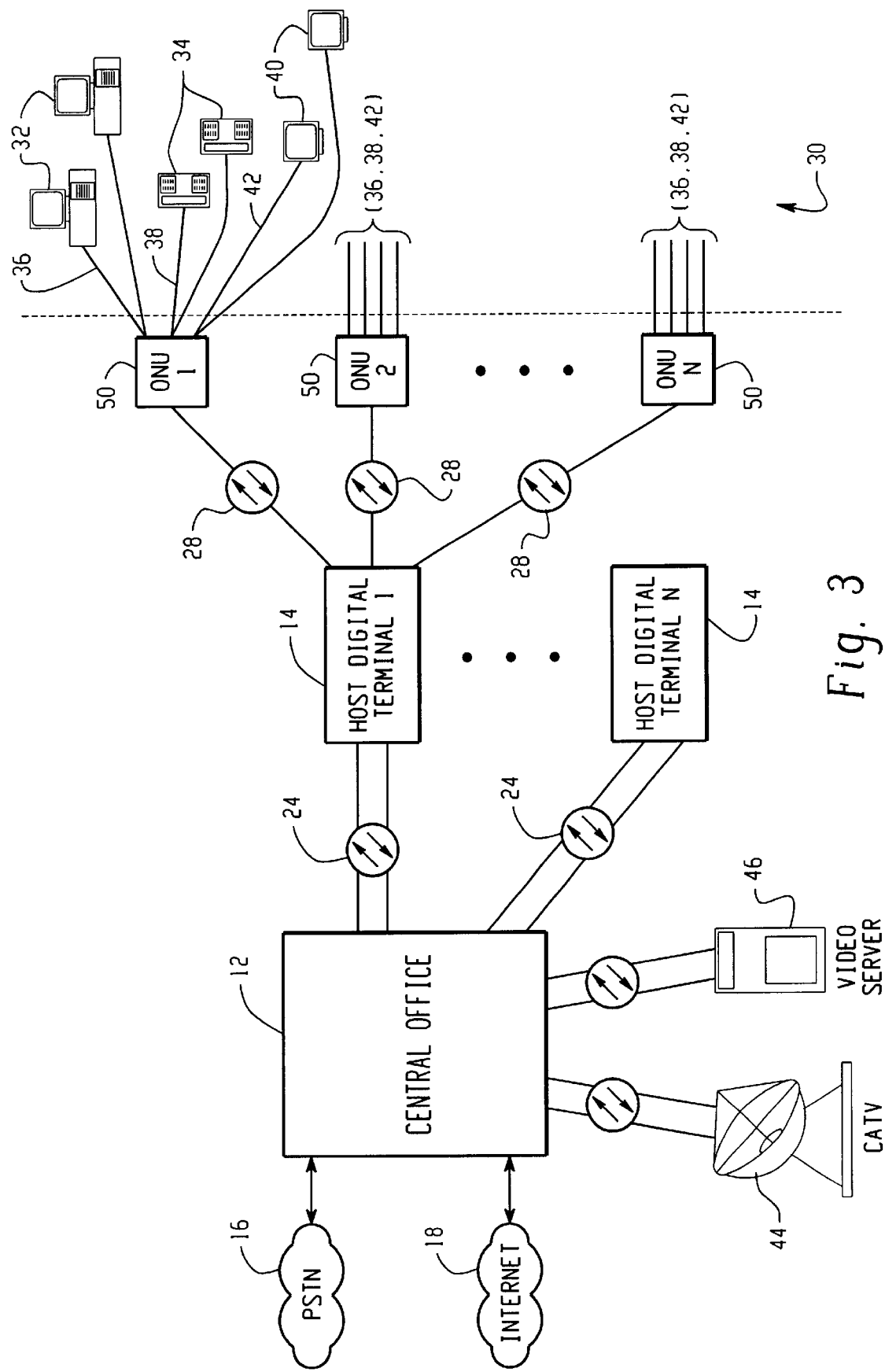
FIG. 3 is a block diagram of a preferred FTTC system according to the present invention for delivering voice, high-speed data, CATV, video-on-demand, and any number of other future high-bandwidth services.

When a backplane-type ONU is designed, it is purposely provided with a backplane structure that can transport more information than is required at the time of installation. However, it is impossible to accurately predict the services that will be required in a FTTC system 5 or 10 years into the future, let alone 20 years, which is the goal from the FTTC customer's perspective. This is particularly true in the telecommunications field, which changes rapidly and towards ever-increasing bandwidth services. Having spent many years designing backplane-type ONU systems, the present inventors have come to the conclusion that it is not possible to design a backplane ONU that is truly future-proof due to the inherent physical limitations of the backplane itself Turning now to the present invention, FIG. 3 is a block diagram of a preferred FTTC system for delivering voice, high-speed data, CATV, video-on-demand, and any number of other future (and even undefined) high-bandwidth services. In many respects, the system of FIG. 3 operates similarly to the system in FIG. 1, but it includes a novel multi-service, adaptable ONU ("MSA-ONU") 50. The MSA-ONU incorporates a future-proof design, and enables the transport of a wide array of multi-media services, including presently defined services and services that have yet to be defined. As described in more detail below, the MSA-ONU 50 is truly future-proof because it has no backplane structure 64 at all, but instead adopts a novel point-to-point interconnection scheme that is scalable, adaptable and flexible so as to support services that have yet to be defined. No other presently known ONU provides these advantages.

Another difference between FIGS. 3 and 1 is that the FTTC system shown in FIG. 3 is capable of transporting telephony information from the PSTN 16, high-speed data information from the Internet 18 (or some other high-bandwidth digital network), and is also capable of transporting wide-bandwidth video information, such as CATV 44 or video-on-demand 46 movies. This widebandwidth video information is transported through the HDT 14 and MSA-ONU 50, and is then routed to television or video equipment 40 located at the customer location 30 via coaxial cable 42, or other means. Although not shown explicitly in this figure, the present invention also provides a unique multi-service common card ("MSCC") that is capable of processing voice, data and video information through a single fiber-optic interface.

Figure 4A:
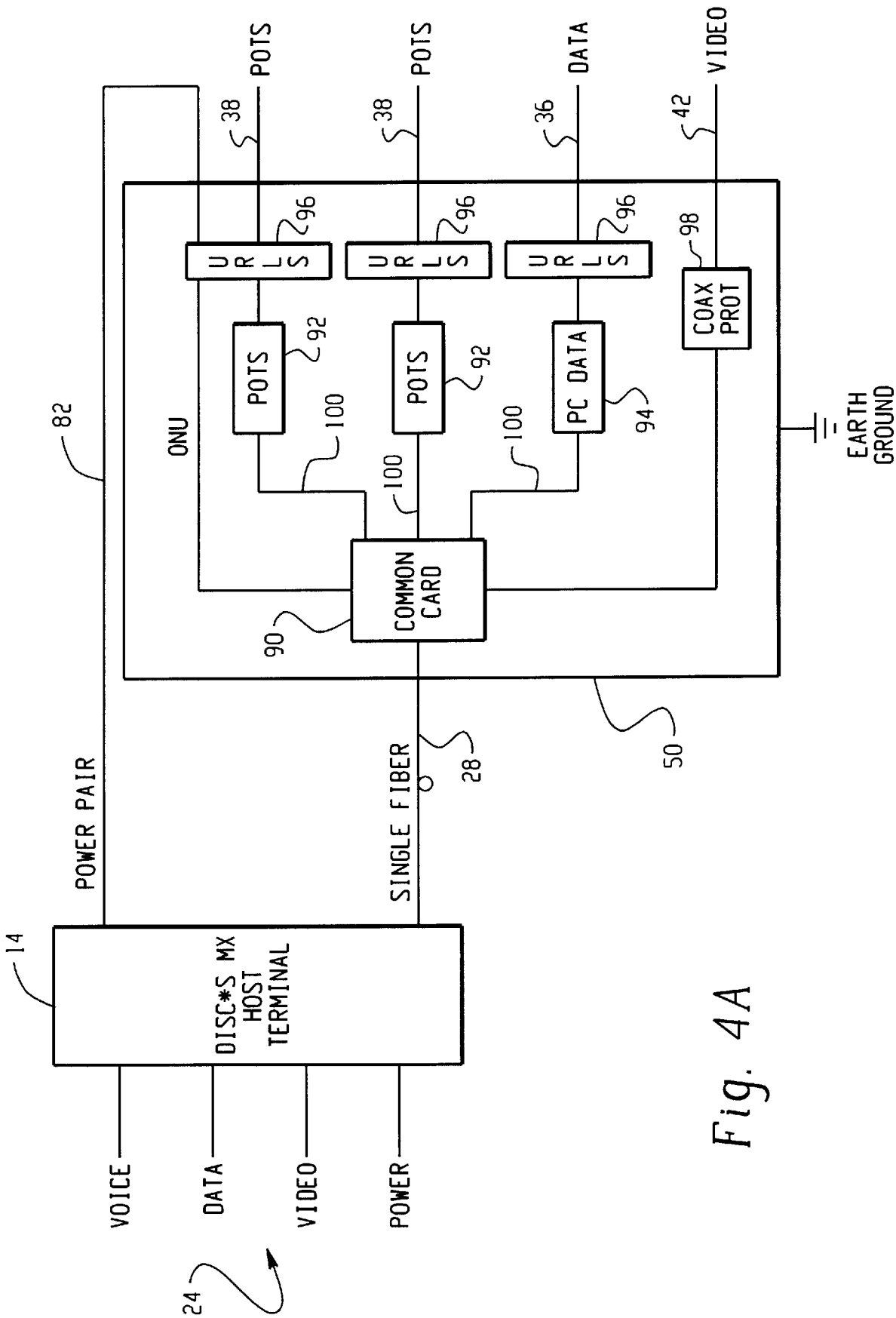
FIG. 4A is a block diagram showing the preferred connections between the HDT and one of the ONUs according to the present invention in which a preferred multi-service common card is coupled to a plurality of service cards in a preferred star configuration.

FIG. 4A is a block diagram showing the preferred connections between the HDT 14 and one of the MSA-ONUs 50 according to the present invention in which a preferred multi-service common card (MSCC) 90 is coupled to a plurality of service cards 92, 94 in a preferred star configuration. The MSA-ONU 50 has no backplane. This fact alone distinguishes its design from presently known ONUs. As shown in more detail in FIG. 4B, the various circuit cards that provide the functionality of the ONU 50 simply slide into a card-cage that mechanically holds the cards. There are no backplane connectors or corresponding circuit card connectors that mate to the backplane. Instead, the MSA-ONU introduces a new concept in telecommunications ONU design—the "card-link" interface 100.

Voice, data, video, and any other type of service are provided from the central office switching center 12 to the HDT 14 via a fiber-optic cable 24. The HDT 14 also receives local AC power, which it converts into corresponding DC levels for powering the various circuits of the HDT 14. As noted previously, the primary purpose of the HDT 14 is to provide an interface between the plurality of ONUs 50 and the central office switching center 12. The HDT 14 couples to an MSA-ONU 50 via a single optical fiber 28 and a power-pair 82. A typical HDT 14, such as the DISC*S® HDT available from Reltec of Bedford, Texas, can couple to 56 ONUs, although, in the future, this number should increase to 112 ONUs and beyond. The optical fiber 28 is for transporting the service information (voice, data, video, etc.), and the power-pair 82 is for delivering remote power to operate the ONU, which typically does not have access to an AC power source.

Service information to and from the HDT 14 is coupled to the multi-service common card (MSCC) 90 in the MSA-ONU 50. The multi-service common card 90 is described in more detail below with reference to FIG. 5. Functionally, this card provides optical-to-electrical conversion, power conversion and distribution, drop-test capabilities, and processes and manages distribution of the various services provided to the MSA-ONU 50, such as telephony, data, and video services. After processing the service information to determine where it should be routed to/from, the MSCC 90 then communicates this information to one or more service cards 92, 94 via a plurality of point-to-point high-speed serial interconnections termed "card-links" 100 by the present inventors. The MSCC 90 also processes video information and routes it to the proper customer location 30 via RF circuitry 98.

The plurality of service cards 92, 94, etc., provide the interface between the customer premises equipment and the MSA-ONU 50, and may include, for example, telephony service cards 92 (also known as POTS cards), high-speed packet-data cards 94 (such as 10 Base-T interface cards), ISDN services, and any other special services that are presently supported by backplane-type ONU systems. These special service cards can be used with the backplane-less MSA-ONU 50 by mounting the backplane-type service card in a special line-card carrier 130 that provides an interface between the known backplane-type signals and the new card-link interface 100 that couples the service cards to the MSCC 90. The service cards 92, 94 are, in turn, coupled to the customer premises equipment via lines 38, 36 through over-voltage protection circuitry 96, which protects the lines from lightning strikes. The video information is simply split off and routed to the customer premises via cable 42 through coaxial protection circuit 98.

The card-link 100 is preferably a high-speed point-to-point serial interconnection that links the MSCC 90 to each of the service cards 92, 94, etc. As shown in FIG. 4A, the configuration of the card-links 100 is preferably a "star" configuration, meaning that there is a separate card-link connection that provides a separate point-to-point coupling between the MSCC 90 and the respective service card, thus forming a star pattern. Alternatively, the card-link 100 could be a daisy-chain type of connection, in which the MSCC 90 is connected to one of the service cards, which is then connected to another service card, and so forth.

Although the daisy-chain type of connection (as well as many other types of serial interconnections) are within the scope of the present invention because presently there are no known backplane-less ONU devices, it is not preferred because it does not provide all of the advantages of the preferred star interconnection. Specifically, the star configuration enables isolation of the service cards and maximizes throughput by providing a separate card-link connection between the MSCC 90 and each service card. For example, if a new service card is added to the MSA-ONU 50 to replace an older card, the card-link 100 for that service card can be individually disconnected without altering or interrupting the remaining service cards in the MSA-ONU 50. In the daisy-chain approach, if one card in the chain needs fixing or updating, the entire chain may have to go out-of-service while the connectors are removed to replace the one service card. Thus, the daisy-chain approach is not as desirable as the star configuration.

Other types of high-speed serial interconnections are also within the scope of the present invention. Indeed, the present invention is not limited to an electrical connection, such as the preferred LVDS interconnection, but may include point-to-point optical interfaces, RF, microwave or other super-high-bandwidth forms of transporting serial data.

The star configuration of the card-links maximizes bandwidth and flexibility in the types of service cards that can be utilized with the MSA-ONU 50. In the backplane-type ONU 10, the services that can be offered are, inherently, limited by the mechanical and electrical properties of the backplane. Likewise, in the daisy-chain approach, the bandwidth is shared among the cards communicating over the common serial interconnect, and thus, although the bandwidth can be increased as technology matures, the flexibility of the daisy-chain interconnect is limited by the number of service cards connected to the common interconnection channel. Not so in the star configuration, since each service card has its own dedicated card-link channel for communication with the MSCC 90. So, for example, one card-link channel 100 can operate at 20 MHZ while other channels are operating at 400 MHZ, all independent of each other. In terms of providing a future-proof design, the only limitation on the bandwidth-transporting capability of the MSA-ONU 50 is the bandwidth of the optical fiber, which is fixed by the properties of the fiber, and the technology available at any given instant in time for transporting high-speed serial information over the card-links 100.

The architecture of the MSA-ONU 50 is truly future-proof As time goes on, new, higher bandwidth and higher capability MSCCs 90 can be substituted for the initial MSCC 90, and, in the same manner, new, higher bandwidth service cards can be added to support presently undefined services. In addition, as time goes on, high-speed serial port driver technology will certainly advance, and these advances can be built into replacement MSCC 90 and service cards as new card-links so that the only parts of the MSA-ONU 50 that need to be replaced to support future services are the cards. Recall that this is not the case with the backplane-type ONUs, which are inherently bandwidth-limited by the electromechanical properties of the backplane. Since there is no backplane in the MSA-ONU 50, these limitations are avoided.

The preferred card-link 100 interface (at the present time) is a low-voltage differential signaling ("LVDS") transceiver technology. LVDS transceiver chips are available from National Semiconductor, as well as several other IC vendors. LVDS is a very-low-power serial interface technology that utilizes a small differential signal-swing to transport information. Because it is differential, noise in the two leads of an LVDS signal cancel each other out so all of the radio EMI and other noise is nullified. This is a key advantage of this type of technology over the backplane-type ONUs, where at higher frequencies (particularly approaching RF range), the backplane radiates like a transmitter, injecting noise into the communication signals and eroding service performance.

Another advantage of LVDS over backplane systems is that you can easily hot-plug LVDS connectors without causing a power failure, or system lock-up. In a backplane system, special edge-connecting fingers are required (as well as other specialized circuitry) to prevent the system from locking-up or crashing when any card in the card-cage is added or removed while the system is powered. Hot insertion of new service cards (and removal of old cards for repair or replacement) is an important function of any ONU system, and this function is more easily facilitated using LVDS to connect the cards.

Although FIG. 4A shows a single MSCC 90, which is the preferred embodiment of the present invention, other possible configurations are possible, and are within the scope of the present invention. For example, a hierarchy of common cards could be provided in the MSA-ONU 50. In such a configuration, the MSCC 90 that is coupled to the incoming fiber 28 could fan-out to connect not only to service cards, but to other common cards—i.e other MSCCs. These other common cards could, in turn connect to a different set of service cards, or to still more common cards. In this way, the basic system could be expanded without replacing the initial MSCC 90 to service more service cards than there are card-links 100 on the initial MSCC. Another configuration could include more than one MSCC 90 coupled to more than one input fiber 28. This plurality of MSCCs could then be individually connected to different service cards, or, if higher-bandwidth services are needed, could in groups be coupled to the same service card, and the bandwidth of the combined MSCC's could then be shared by the single service card. Many other configurations of the MSCC's and service cards are also possible, and are all within the scope of the present invention.

Another advantage of the present invention is that it provides a modular approach to FTTC systems. Because the MSA-ONU 50 is easily upgraded by simply installing a new MSCC 90 or new service cards, an entire line of adaptable, flexible ONU systems can be offered. For example, a particular customer may want to install a video-only FTTC system, and then expand later to cover telephony, data, ISDN, or other future services. For this customer, a video-only MSCC 90 can be provided initially that simply provides video interfacing services to the customer's serviced by the particular ONU. Later, if telephony services are needed, a new MSCC 90 with both video and telephony capabilities (along with the appropriate telephony service cards) can be installed into the MSA-ONU 50. Then, if high-speed data services are to be provided, another MSCC 90 that provides telephony, video and data services could be installed along with the appropriate data service cards. And so on, and so on. As the FTTC system requirements grow, the MSA-ONU 50 capabilities can scale to meet these requirements. This type of future-proof scalability is simply not possible in presently available FTTC systems that rely on backplane ONU devices, again, due to the inherent limitations of the backplane approach.

Figure 4B:
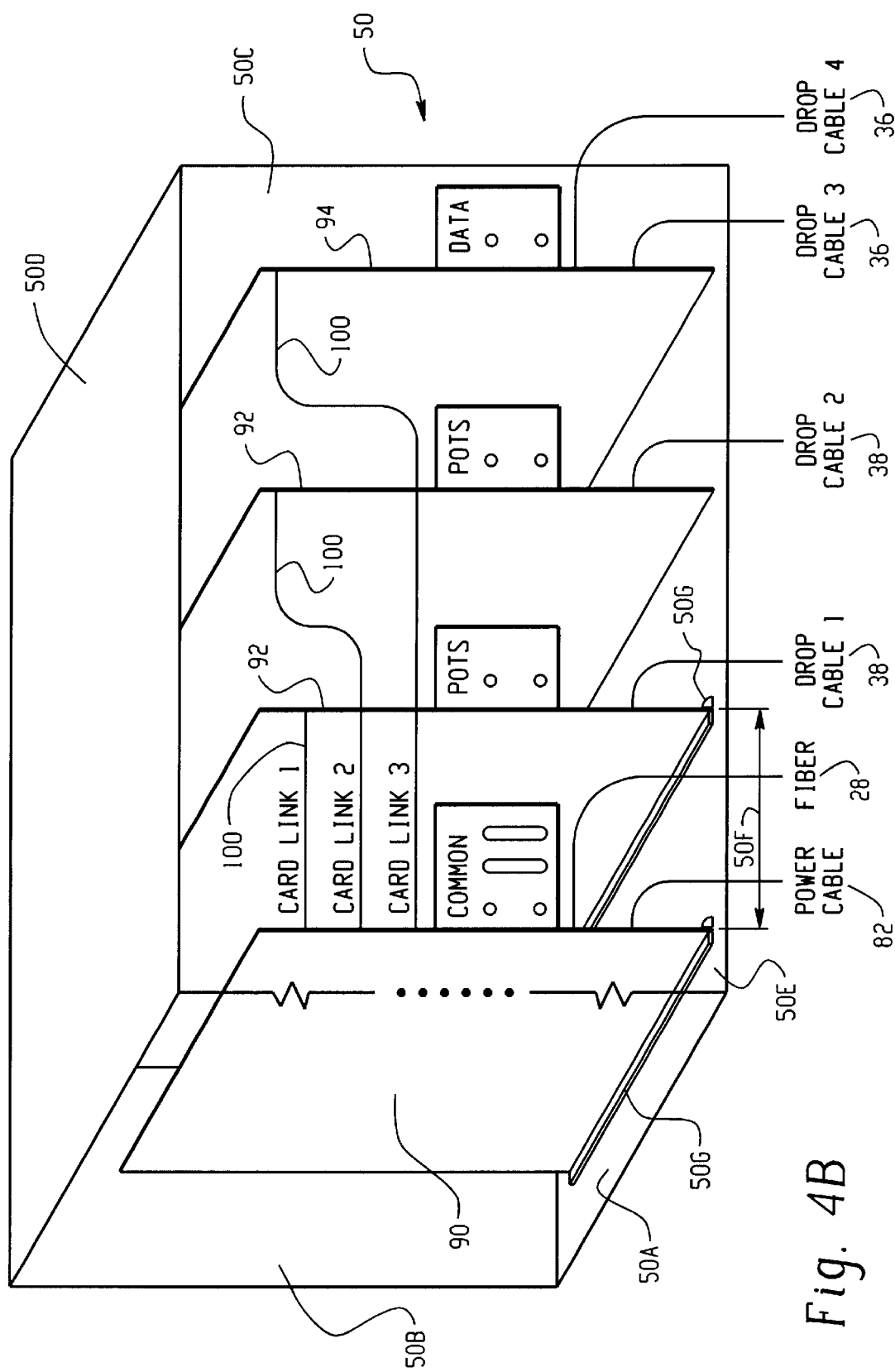
FIG. 4B is a schematic of a preferred card cage without a backplane for receiving the multi-service common card and the plurality of service cards as shown in FIG. 4A.

FIG. 4B is a schematic of a preferred card-cage for housing the MSCC 90 and the service cards of the MSA-ONU 50 shown in FIG. 4A. The card cage includes a bottom plate 50A, back plate 50B, two side plates 50C, a top plate 50D, and a bottom plate 50E. The front of the card cage is open to facilitate the insertion/removal of circuit cards into the system.

A plurality of card-guides 50G are mounted on at least one of the top 50D or bottom 50E plates. As shown in FIG. 4B, the card guides 50G are mounted only on the bottom plate 50E. Alternatively, card guides 50E could be mounted on both the top and bottom plates. The purpose of the card guides 50E is to mechanically hold the circuit cards in a particular position within the card cage. The spacing 50F between the guides 50E is adjustable, such that cards of different widths can be easily accommodated within the card cage. Because there is no backplane in the MSA-ONU card cage 50 (which, if it existed, would be located on the back plate 50B as in FIG. 2A) into which the circuit cards are connected, the spacing between the cards can be adjusted to accommodate any sized card. This advantage of the MSA-ONU 50 is not feasible in the backplane-type ONUs because of the fixed spacing between the backplane connectors 66 into which any card must be inserted in order to operate within the system.

FIG. 4B shows an example card cage 50 housing a single MSCC 90, two POTS telephony service cards 92, and a single multi-port data card 94. The MSCC 90 is connected to each of the service cards by a card-link 100 in a star configuration such that each service card 92, 94 makes a separate point-to-point connection with the single common card 90. Note that the card-links are made via the open front of the card cage. To replace or repair any particular service card, the drop cable 36, 38 providing the connection to the customer premises 30 is disconnected, and the card-link connector is removed. The service card to be repaired or replaced can then be simply removed from the card cage 50 without effecting the performance or risking a power-surge to any of the other service cards (or the common card), since there are no backplane connections to break in removing the card. The new (or repaired) card can then be inserted into the card cage, and the card-link connections reestablished. Of course, if the MSCC 90 is to be repaired or replaced, then all of the card-link connections must be detached in order to remove the common card.

Figure 5:
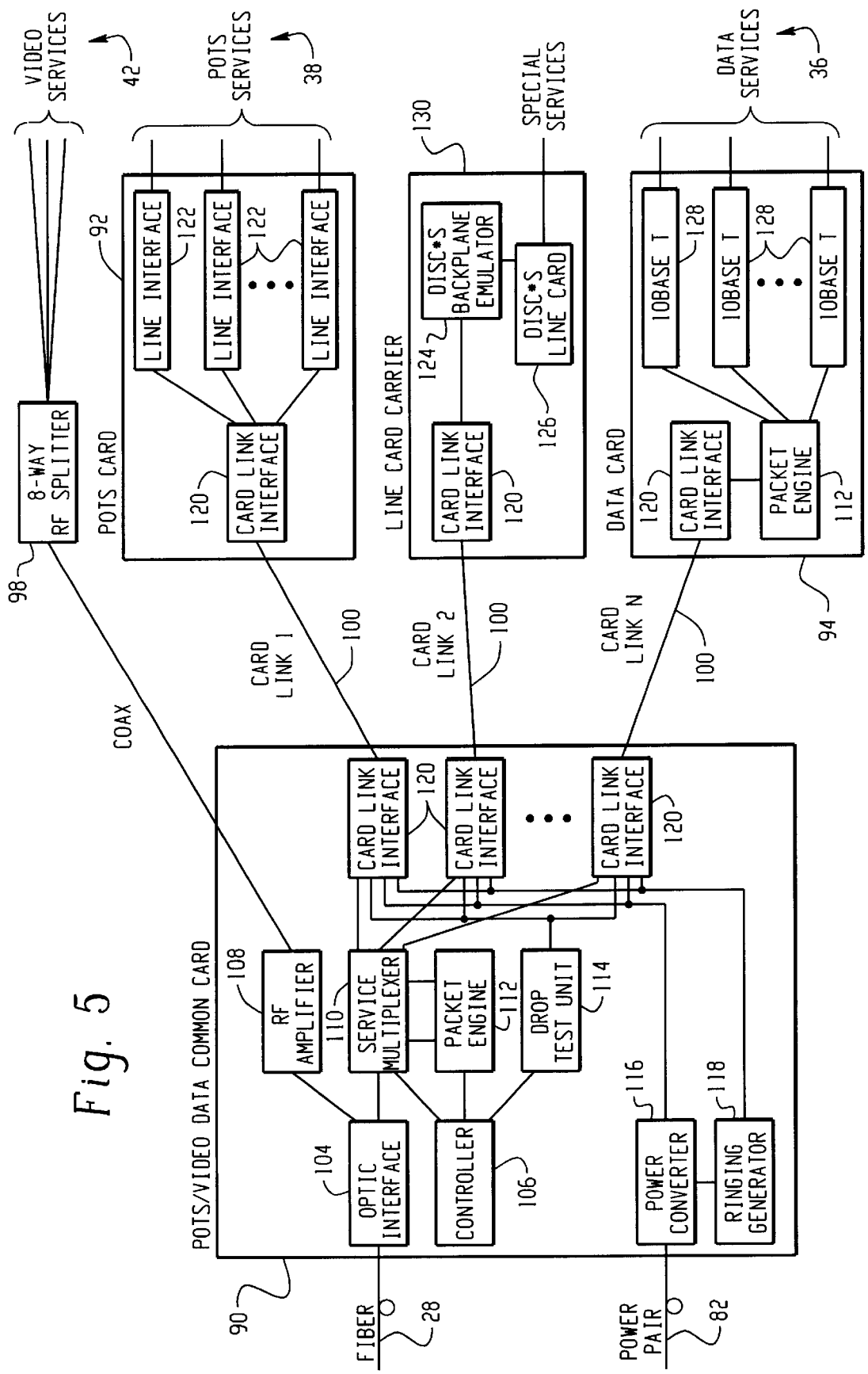
FIG. 5 is a more detailed block diagram of the preferred multi-service common card showing the preferred star configuration interconnections to the plurality of service cards via a plurality of card-links.

FIG. 5 is a more detailed block diagram of the preferred multi-service common card (MSCC) 90 showing the preferred star configuration interconnections to the plurality of service cards via a plurality of card-links 100. As noted previously, the MSCC 90 is connected to the HDT 14 via a fiber connection 28 and a power-pair connection 82. The only other connections between the MSCC 90 and the outside world are preferably through the plurality of card-links 100 (for the variety of service offerings) and one or more coaxial drops to distribute incoming video signals. The service offerings contemplated at the time of filing this application include telephony services, such as standard analog POTS telephone service, data services, such as 10 Base-T Ethernet, ISDN, ATM, frame-relay, or XDSL, and video services, such as CATV or video-on-demand. Other speciality telephony services that may be supported by backplane-type ONU service cards can also be used in the MSA-ONU 50, such as COIN services, DS-1, PBX trunks, Centrex lines, WATS lines, foreign exchange lines, low-speed digital data services, NxDS-0 services, etc., by installing the specialty cards into a line-card carrier 130 that operates as an adaptor between the backplane-type interconnections on the speciality service card connector and the card-link interface 100. In addition, other services not explicitly mentioned and future broadband services could also be implemented into the MSA-ONU 50 by installing new service cards or new MSCCs, or a combination of both, for providing services such as real-time videoconferencing, digital TV, interactive video services, etc.

The example MSA-ONU 50 system shown in FIG. 5 includes N card-links 100 for coupling N service cards, such as POTS cards 92, line-card carriers 130 and high-speed data cards 94 to the MSCC 90, and a single coax connection to an 8-way splitter 98 for distributing CATV video services, for example. This is just one example of the types of services that could be implemented in the MSA-ONU 50 of the present invention. As noted above, the system could be initially configured with any combination of service cards for delivering video-only, data-only, video and data, video and telephony, data and telephony, or video, data and telephony, depending on the requirements of the installation. Over time, new services can be easily added by installing an appropriate service card and a new MSCC 90 (if necessary) to support the added services, including those broadband services that have yet to be defined. This type of adaptability is not possible with current backplane ONUs due to the inherent physical and electrical limitations of the backplane.

The MSCC 90 may include the following elements: a fiber optic interface circuit 104; a system controller 106; an RF amplifier 108; a service multiplexer 110; a packet engine 112; a drop test unit 114; a power converter 116; a ringing generator 118; and a plurality of card-link interface circuits 120. Note that this is just one possible implementation of the MSCC 90, with just one example of the types of circuits that could be included. In this example, the MSCC 90 is configured to support telephony, data and video services. Other configurations of the MSCC are possible.

The MSA-ONU 50 is powered from the HDT 14 via power pair 82. The power pair 82 is, in turn, coupled to the internal power converter 116, which preferably generates the −48V, +/−6V, and +3.3V power levels to power the common card and the plurality of service cards. Also coupled to the power converter is a ringing generator 118 that provides the well-known ringing voltage necessary for the POTS service cards 92. The power converter 116 may include a number of sub-elements, such as a high-voltage protection circuit, an input current limiter, and a number of DC/DC converters for generating the various voltage levels. Other specialized power circuits may also be included.

The fiber optic interface 104 connects the MSA-ONU 50 to the HDT 14, and has, as its primary purpose, the conversion of optical signals into electrical signals and vice versa. The fiber optic interface 104 may include an optical diplexer/triplexer, a laser driver for transmitting information onto the fiber, and a receiver for receiving information from the fiber. The video information, if in an analog form, can be split from the optical signal via appropriate filters and amplifiers 108 and then provided to the customer premises 30 via an N-way splitter 98 which replicates the CATV-type video signal to a plurality of customers. Other types of video services, such as video-on-demand, videoconferencing, digital TV, etc., may require more advanced extraction and processing techniques prior to relaying the signals to the customer locations.

The controller 106, service multiplexer 110, packet engine 112, and the drop test unit 114 provide the basic functionality of the MSCC 90. The overall operation of the common card 90 is dictated by the controller 106, which is preferably an Intel 188 Processor, or other equivalent type of embedded microcomputer, microcontroller or processor. Auxiliary circuitry, such as SRAM, Flash ROM EEPROM, and a serial interface port for testing and possibly downloading new configuration information to the controller may also be included with the controller 106.

The service multiplexer 110 provides the basic function of separating (or demultiplexing) the incoming information from the fiber optic interface 104 and routing it to the appropriate service card(s) via the card-link interfaces 100. The packet engine 112 is coupled to the service multiplexer 110, and provides the basic digital packet data handling functions required to transport high-speed digital data and to convert data packets into serial form and vice versa for transport over the card-link interface to the data cards. The drop test unit 114 includes analog-to-digital and digital-to-analog converters, and provides the functionality to enable remote testing of drop circuits (i.e. connections from the MSA-ONU 50 to customer equipment) from the central office switching station 12.

Demultiplexed signals from the service multiplexer 110, which may include PCM telephony information as well as other types of information such as high-speed data, etc., are routed to the appropriate card-link interfaces 120 for transport to the appropriate service cards over the plurality of card-links 100. The drop test unit 114, power converter signals 116 and the ringing generator outputs 118 may also be routed to the card-link interfaces 120 for distribution to the appropriate service cards.

The service multiplexer 110, packet engine 112, and card-link interfaces 120 are preferably implemented in a field-programmable gate array ("FPGA"), which includes appropriate power control/alarm, oscillator, and memory support circuits. Alternatively, the controller 106 could also be implemented in the same FPGA, or some other device. Other types of programmable and reprogrammable controllers could be used instead of an FPGA, and, indeed, may be preferable for future services that have yet to be defined, such that the entire operation of the controller 106 and the specific services implemented in the FPGA could be reprogrammed or reconfigured either at a particular MSA-ONU location by dispatching a service technician, or by remotely reprogramming the system via the fiber-optic cable 28 interface that couples the ONU back to the central office switch 12 via the HDT 14. In this situation, a new MSCC card would not be required, but instead the MSCC already in the system would be reprogrammed to handle the new service offering.

In the example system shown in FIG. 5, the MSCC 90 is coupled to N service cards via N card-links 100. These card-links are preferably organized in a star configuration, such that each service card makes an independent point-to-point connection to the MSCC 90. Other configurations of the card-links are also possible. Shown in FIG. 5 are three example service cards: (1) a POTS multi-drop telephony card 92; (2) a single-drop line-card carrier 130; and (3) a multi-drop 10 Base-T Ethernet data card 94. Other service cards, including those that implement future services that have yet to be defined can also be used with the present invention. The POTS card 92 includes a corresponding card-link interface circuit 120 for communicating over the card-link 100 that connects the MSCC 90 to the POTS card 92, and also includes a plurality of POTS line interface circuits (such as 8). These types of circuits are typically implemented using an FPGA coupled to a plurality (such as 8) of R-Forward LC circuits with a switching regulated current loop that interface directly to the tip and ring signals of the twisted-pair copper connection 38 to the customer's telephone equipment 34.

The line-card carrier service card 130 is used to interface backplane-type service cards to the new MSA-ONU 50 system. The line card carrier 130 includes a card-link interface 120, a connector for receiving the backplane-type service card 126, and a backplane emulator circuit 124 that forms an interface between the backplane-type signals and the signals propagated over the card-link 100. The emulator circuit 124 is preferably implemented using an FPGA, and communicates signals such as Sclk, Sync, PCM, CUDL and DPCM to the backplane-type service card. These signals are converted into a serial format for transmission over the card-link 100.

The multi-drop 10 Base-T Ethernet data card 94 provides a plurality of commonly used 10 MB/sec symmetrical 10 Base-T interface lines in a single card. Also included on this card is the card-link interface circuitry 120, and a packet engine (corresponding essentially to the packet engine 120 in the MSCC 90) for converting the serial data stream from the card-link 100 into Ethernet packet data and vice versa.

Figure 6:
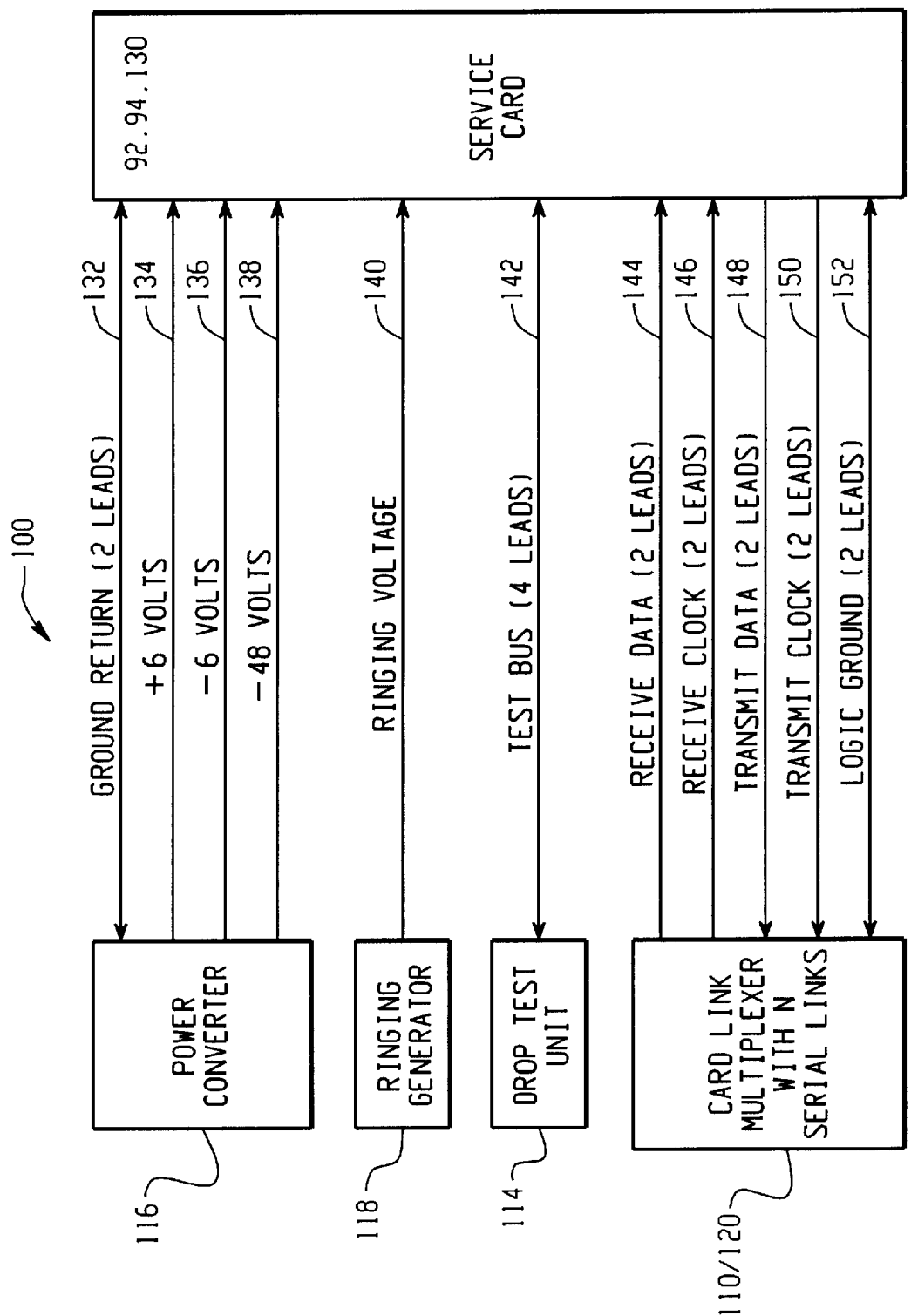
FIG. 6 is a more detailed block diagram showing a preferred series of connections between the common card and one of the service cards forming one of the card-links.

FIG. 6 is a more detailed block diagram showing a preferred series of connections between the MSCC 90 and one of the service cards forming an exemplary card-link 100. As noted above, the card-link 100 is preferably a high-speed multi-pin serial interface, such as provided by LVDS technology, although, alternatively, other interface schemes could also be used. Each service card requires power. Preferably, five signals from the MSCC 90 power converter 116 are coupled to a service card, including two ground leads 132, +/−6 volts 134, 136, and −48 volts 138. Other power signals could also be used, and a variety of different voltage levels could be provided to the service card depending on the requirements of the service.

The service card may also require a ringing voltage signal, such as in the case of a POTS telephony card 92. In this case, a ringing voltage signal 140 is provided from the ringing generator 118 on the MSCC 90 to the service card via the card-link interface. In addition, it may be desirable to be able to test the drop circuit for a particular service card from the ONU to the customer premises. In this event, a 4-lead test bus 142 can be provided over the card-link 100, from the drop test unit 114 to the particular service card.

The previously mentioned signals 132–142 are auxiliary signals that can be provided by means other than the card-link 100, but, in this example system, are preferably provided over the same connections as the card-link data lines 144–152. The card-link data lines 144–152 form the high-speed serial interface between the MSCC 90 and the plurality of service cards. As noted above, the preferred implementation of these connections 100 is in a star configuration such that each service card makes a separate high-speed point-to-point connection with the MSCC 90. The card-link data lines include 2 receive lines 144 (recall that the preferred implementation is LVDS, which provides for differential signaling, and hence 2 lines are required per signal), 2 receive clock lines 146, 2 transmit lines 148, 2 transmit clock lines 150, and 2 logic ground lines 152. The actual high-speed serial data is transported on the transmit and receive lines 148, 144, and synchronization clocking information is transported on the transmit and receive clock lines 150, 146, which are used by the card-link interface circuits 120 to ensure proper receipt and transmission of the card-link serial data at the appropriate frequency. This is just one example of the types of serial data signals that could be exchanged over the card-link.

Having described in detail the preferred embodiments of the present invention, including the preferred modes of operation, it is to be understood that this operation could be carried out with different elements and steps. These preferred embodiments are presented only by way of example and are not meant to limit the scope of the present invention which is defined by the following claims.

What is claimed:

1. A fiber-to-the-curb digital loop carrier system for transporting multi-media information in the local loop between a central office switching station and a plurality of customer locations, comprising:
    a plurality of host digital terminals coupled to the central office switching station by fiber-optic connections; and
    at least one optical network unit coupled to a host digital terminal by fiber-optic connections, wherein each optical network unit comprises:
        at least one multi-service common card, comprising: a fiber optic-interface; a service multiplexer; and a plurality of card-link interface circuits;
        a plurality of service cards, comprising: circuitry for processing a particular multi-media service; and at least one card-link interface circuit; and
        a plurality of card-links coupling the plurality of service cards to the multi-service common card, wherein the card links are low voltage differential signal (LVDS) connections.

2. The system of claim 1, wherein the multi-media information includes telephony, high-speed data packets and video information.

3. The system of claim 1, wherein the multi-service common card further comprises a controller for managing the operation of the card.

4. The system of claim 3, wherein the multi-service common card further comprises: a packet engine, and an RF amplifier.

5. The system of claim 4, wherein the multi-service common card is capable of processing telephony, packet data and video information.

6. The system of claim 5, wherein the service multiplexer, packet engine and card-link interface circuits are implemented in a field programmable gate array (FPGA).

7. The system of claim 3, wherein the controller is reprogrammable.

8. The system of claim 1, wherein the multi-service common card further comprises a drop test unit.

9. The system of claim 1, wherein the multi-service common card further comprises a power converter and a ringing generator.

10. The system of claim 1, further comprising at least two multi-service common cards configured in a hierarchical manner.

11. The system of claim 10, wherein the at least two multi-service common cards are connected via a card-link.

12. The system of claim 1, wherein the plurality of service cards include at least one telephony card.

13. The system of claim 1, wherein the plurality of service cards include at least one packet data card.

14. The system of claim 1, wherein the plurality of service cards include a line-card carrier for interfacing a backplane-type service card to the card-link interface.

15. The system of claim 1, wherein the card-links comprise high-speed serial connections.

16. The system of claim 1, wherein the card-links comprise high-speed point-to-point serial connections.

17. The system of claim 16, wherein the card-links that connect the service cards to the multi-service common card are organized in a star configuration.

18. The system of claim 16, wherein the card-links that conne cards to the multi-service common card are organized in a daisy-chain configuration.

19. The system of claim 1, wherein the card-links are optical connections.

20. The system of claim 1, wherein the card-links are wireless connections.

21. The system of claim 1, wherein at least one service card is connected to the multi-service common card by a plurality of card-links.

22. The system of claim 1, wherein the optical network unit includes a card-cage for mechanically holding the multi-service common card and the plurality of service cards.

23. The system of claim 22, wherein the card-cage includes card-guides for each card.

24. The system of claim 23, wherein the card-guides are adjustable to support different sized cards.

25. An optical network unit for use in a fiber-to-the-curb system, comprising:

a multi-service common card;

a plurality of service cards; and a plurality of serial interface connections for communicating information between the common card and the plurality of service cards, wherein the serial interface connections are low voltage differential signal (LVDS) connections.

26. The optical network unit of claim 25, wherein the plurality of serial interface connections are connected in a star configuration.

27. The optical network unit of claim 25, wherein the plurality of serial interface connections are connected in a daisy-chain configuration.

28. The optical network unit of claim 25, wherein the serial interface connections are optical connections.

29. The optical network unit of claim 25, wherein the serial interface connections are wireless connections.

30. The optical network unit of claim 25, wherein the multi-service common card includes:

a fiber optic interface;

a service multiplexer; and a plurality of card-link interface circuits for implementing the plurality of serial interface connections.

31. The optical network unit of claim 30, wherein the multi-service common card further includes:

a controller;

a packet engine; and a drop test unit.

32. The optical network unit of claim 31, further including a power converter and a ringing generator.

33. The optical network unit of claim 32, wherein signals from the power converter, ringing generator, service multiplexer and drop test unit are communicated over the serial interconnections between the multi-service common card and the plurality of service cards.

34. The optical network unit of claim 25, wherein the plurality of service cards include: a telephony card; and a high-speed data card.

35. The optical network unit of claim 25, wherein the multi-service common card is capable of processing video, data and telephony information.

36. The optical network unit of claim 25, further comprising a card cage with adjustable card guides for holding the multi-service common cards and the plurality of service cards.

* * * * *

UNITED STATES PATENT AND TRADEMARK OFFICE
CERTIFICATE OF CORRECTION

PATENT NO. : 6,362,908 B1  
DATED : March 26, 2002  
INVENTOR(S) : Kimbrough et al.

It is certified that error appears in the above-identified patent and that said Letters Patent is hereby corrected as shown below:

<u>Column 16,</u>  
Line 61, delete "conne" insert -- connect the service --

Signed and Sealed this

Sixteenth Day of July, 2002

*Attest:*

*Attesting Officer*

JAMES E. ROGAN  
*Director of the United States Patent and Trademark Office*